Feb. 9, 1926.
G. W. WILDIN
1,572,173
TRAIN SPEED CONTROL DEVICE
Filed June 28, 1923
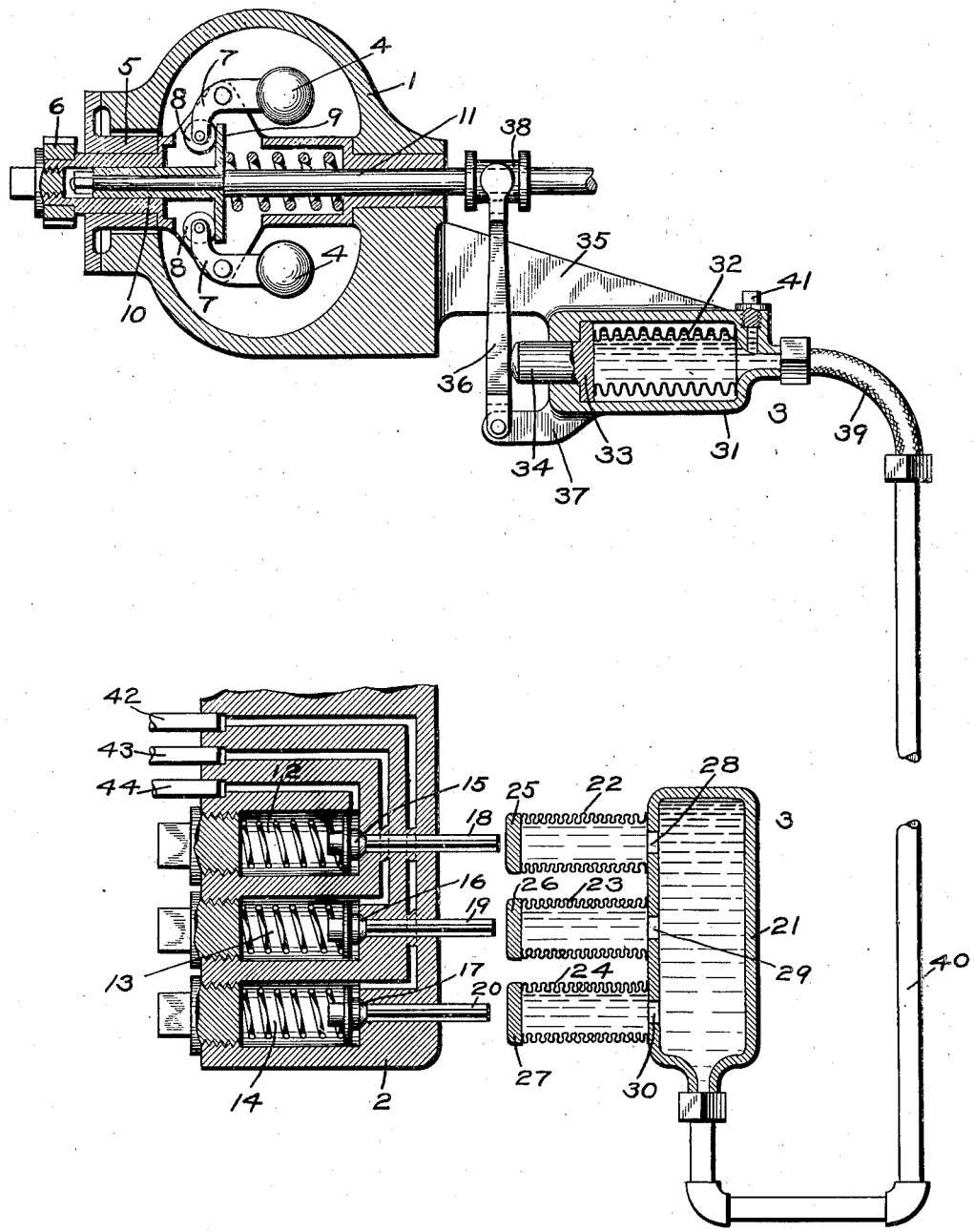
INVENTOR
GEORGE W. WILDIN
BY *Wm. M. Cady*
ATTORNEY Patented Feb. 9, 1926.

1,572,173

UNITED STATES PATENT OFFICE.

GEORGE W. WILDIN, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRAIN-SPEED-CONTROL DEVICE.

Application filed June 28, 1923. Serial No. 648,267.

*To all whom it may concern:*

Be it known that I, GEORGE W. WILDIN, a citizen of the United States, residing at Pittsburgh, in the county of Allegheny and State of Pennsylvania, have invented new and useful Improvements in Train-Speed-Control Devices, of which the following is a specification.

This invention relates to speed controlling devices, and more particularly to an automatic train speed controlling device. The principal object of my invention is to provide improved means for transmitting power from a speed controlled governor device to mechanism for controlling the speed of the vehicle.

In the accompanying drawing, the single figure is a diagrammatic sectional view of an automatic speed controlling mechanism embodying my invention.

As shown in the drawing, the speed control mechanism may comprise a speed controlled governor 1, a valve mechanism 2 for controlling the speed of the train, and a transmission mechanism 3 for transmitting power from the governor 1 to the valve mechanism 2.

The speed controlled governor 1 may comprise a casing having a chamber in which governor balls 4 are adapted to rotate. A hollow rotatable shaft 5 is mounted in suitable bearings in the casing 1 and the end of the shaft which projects outside of the casing carries a pinion 6 which co-operates with a gear on the car axle (not shown) so that the shaft 5 will be rotated at a speed proportional to the speed of the vehicle. Arms 7 carrying the governor balls 4, are pivotally mounted on the shaft 5 and are provided with rollers 8 adapted to engage a radial flange 9 of a sleeve 10 mounted in the hollow shaft 5. The sleeve 10 is adapted to engage a shoulder on a centrally arranged shaft 11, so that in proportion to the increase in speed of the vehicle the governor balls move outwardly by centrifugal action and cause a movement of shaft 11 toward the right.

In order to avoid unnecessary complication, only so much of the vehicle speed controlling mechanism is shown in the drawing as deemed necessary to a complete understanding of my invention. As shown, the valve mechanism 2 comprises a casing having a plurality of valve chambers 12, 13, and 14 containing valves 15, 16, and 17 respectively, each valve having a corresponding valve stem 18, 19, and 20 extending outside of the casing and having different lengths, as shown.

The mechanism 3 for transmitting movement from the speed governor device 1 to the train speed controlling valve mechanism 2 may comprise a casing 21 having longitudinally expansible corrugated metal tubes 22, 23, and 24 soldered or otherwise secured to the casing so as to make a leak tight joint with the casing. Said tubes are closed at their respective outer ends by disks 25, 26, and 27, the tubes being soldered or otherwise secured to the disks so as to provide leak tight joints. The tubes 22, 23, and 24 are located in alinement with the respective valve stems 18, 19, and 20, so that when the tubes are expanded longitudinally the disks 25, 26, 27 will respectively engage the valve stems 18, 19, and 20. The chamber within casing 21 communicates with the interior of the tubes 22, 23, and 24 through the respective openings 28, 29, and 30 in the casing.

Secured by a bracket 35 to the speed governor 1 is a casing 31, within which is contained a longitudinally compressible corrugated metal tube 32 having one end of the tube secured to the end wall of the casing so as to make a leak tight joint and having the other end of the tube provided with a movable abutment 33. The abutment 33 has a stem 34 which projects outside of the casing 31 and is adapted to be engaged by a lever arm 36 which is pivoted at one end to an arm 37 carried by the casing 31.

The other end of the lever 36 is bifurcated and is positioned between flanges of a sleeve 38 secured to the governor shaft 11. The space within the metal tube 32 is connected through a flexible connection 39 and piping 40 to the chamber of casing 21 and the connected chambers are filled with a liquid, such as alcohol or glycerine, by removing the filler cap 41, associated with the casing 31.

In operation, when the governor is not rotating, the parts will be in the positions shown in the drawing, with the metal tube 32 expanded and the tubes 22, 23, and 24 retracted. If the train is running, the governor balls 4 will be rotated through the connection of the pinion 6 with a gear (not shown) associated with the axle of the vehicle and as the train speed increases, the governor balls are thrown out by centrifugal action, causing a movement of shaft 11 to the right. The lever 36 is then shifted toward the right by the sleeve 38, so that stem 34 is operated to move the abutment 33 toward the right. The corrugated tube 32 is then compressed so that liquid therein is forced through the piping 40 to casing 21 and thence through the openings 28, 29, and 30 into the tubes 22, 23, and 24. A movement of the disks 25, 26, and 27 toward the left is thus produced in proportion to the speed of the train and the corresponding movement of the governor shaft 11.

If the speed of the train does not exceed a predetermined low speed limit, the disks 25, 26, and 27 will be moved to the left only a sufficient distance to permit the disk 25 to engage the stem 18 of the low speed valve 15, but if this low speed limit is exceeded the valve 15 is lifted from its seat. If the speed control apparatus (not shown) is adjusted to limit the speed of the train to the low speed limit then the opening of valve 15 will vent fluid from pipe 44 which is then adapted to effect an application of the brakes so as to reduce the speed of the train. If the speed control apparatus is adjusted for limiting the speed of the train to the medium speed limit, then the speed of the train may be maintained at the higher speed limit. If the speed exceeds the medium speed limit, the speed governor will operate to effect the movement of lever 36 so that the liquid forced into casing 21 by operation of the abutment 33 will be sufficient to cause a movement of the disks 25, 26, and 27 to the left so that the disk 26 will engage the stem 19 and open valve 16. Fluid is then vented from pipe 43 to effect an application of the brakes.

In a similar manner, if the speed control apparatus is set for the high speed limit, no brake application will be caused until the speed of the train exceeds the high speed limit, when the movement of the disks 25, 26, and 27 will be such that the disk 27 will engage stem 20 and open valve 17, so that fluid will be vented from pipe 42 to effect an application of the brakes.

The speed governor 1 is usually located adjacent to the driving vehicle axle, while the valve mechanism 2 may be located at a remote point, such as in the cab of the locomotive, and by employing a liquid transmission link for transmitting the action of the speed governor 1 to the valve mechanism 2, mechanical connections are avoided, which may be difficult to employ owing to the fact that the speed governor and the valve mechanism 2 are located at different points on the vehicle.

Having now described my invention, what I claim as new and desire to secure by Letters Patent, is:—

1. In a train speed control apparatus, the combination with a governor device having a member movable by the governor according to the speed of the train and a valve mechanism operable to control the speed of the train, of liquid pressure operated means for operating said valve mechanism and a movable abutment exposed to the liquid acting on said means and operated by said governor member for varying the pressure of the liquid.

2. In a train speed control apparatus, the combination with a governor device having a member movable by the governor according to the speed of the train and a valve mechanism operable to control the speed of the train and including a plurality of valves having valve stems of varying lengths, of liquid operated means for successively engaging said valve stems, a movable abutment operable by said governor member, and a liquid link connecting said abutment with said liquid operated means.

3. In a train speed control apparatus, the combination with a governor device having a member movable by the governor according to the speed of the train and a valve mechanism operable to control the speed of the train and including a plurality of valves having valve stems of varying lengths, of means subject to the pressure of liquid in a chamber for operating said valve stems and a movable abutment operated by said governor member for varying the pressure of liquid in said chamber.

4. In a train speed control apparatus, the combination with a governor device having a member movable by the governor according to the speed of the train and a valve operable to control the speed of the train, of a longitudinally expansible corrugated metal tube having a closed end portion for operating said valve, and means operated by said governor member for supplying liquid under pressure to said tube.

5. In a train speed control apparatus, the combination with a governor device having a member movable by the governor according to the speed of the train and a valve operable to control the speed of the train, of a longitudinally expansible corrugated metal tube having a closed end portion for operating said valve, a longitudinally expansible corrugated metal tube having a closed end portion operable by said governor member, and a liquid column connecting the end portions of said tubes.

6. In a train speed control apparatus, the combination with a governor device having a member movable by the governor according to the speed of the train and a valve operable to control the speed of the train, of a longitudinally expansible corrugated metal tube having a closed end portion for operating said valve, a chamber containing liquid and communicating with the interior of said tube, a longitudinally compressible corrugated metal tube having a closed end portion operable by said governor member and containing liquid, and piping connecting the interior of the compressible tube with said chamber.

In testimony whereof I have hereunto set my hand.

GEORGE W. WILDIN.